Aug. 18, 1931.  G. FLEISCHEL  1,819,237
CONTROL SYSTEM FOR AUTOMATIC GEAR AND CLUTCH SHIFTING ASSEMBLIES
Filed March 4, 1931  2 Sheets-Sheet 1

Gaston Fleischel
Inventor
by Louis Barnett
Attorney

Patented Aug. 18, 1931

1,819,237

UNITED STATES PATENT OFFICE

GASTON FLEISCHEL, OF BLENEAU, FRANCE

CONTROL SYSTEM FOR AUTOMATIC GEAR AND CLUTCH SHIFTING ASSEMBLIES

Application filed March 4, 1931, Serial No. 520,091, and in France September 17, 1930.

The present invention relates to controls for automatic clutch and gear shifting assemblies of the type described in co-pending application, Serial No. 440,020, filed March 28th 1930.

One of the objects of the present invention is to provide means operative to graduate the rate at which clutch and gear shifting takes place in assemblies of the type above referred to.

Another object is to provide means operative to effect said graduated control automatically as a function of conditions under which the motor or a vehicle operates.

A further object is to provide a regulable control for the mechanism used to retard (or accelerate) the rate of transmission of movement in the control assembly to the mechanism operating to effect shifting of the clutch or gears.

Further objects will appear in the course of the detailed description now to be given with reference to the accompanying drawings in which.

Figure 1:
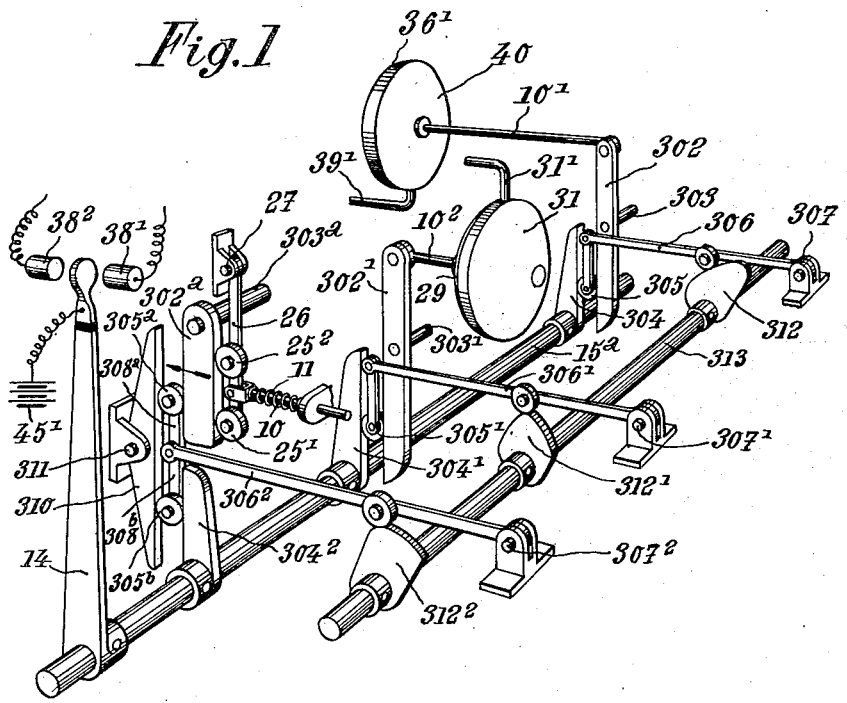
Fig. 1 is a perspective of one illustrative embodiment of the invention.

Referring to Fig. 1 of the drawings, there is shown a control assembly of the general type already disclosed in the copending application above referred to and consisting of the following elements: A lever 14 rigidly mounted on a shaft $15^a$ and having an insulated conducting extremity adapted to contact with either one of two terminals $38^1$ and $38^2$ controlling a gear shifting system (not shown) toward the increasing speed of decreasing sides respectively, the extremity of the lever being provided with current from a battery $45^1$; a chamber $36^1$ provided with a flexible wall 40 and receiving water under pressure through a conduit $39^1$ from the circulating system cooling the motor; a rod $10^1$ connected at one end to membrane 40 and reacting at its other end on a lever 302 pivotally mounted at 303; a lever 304 rigidly connected to shaft $15^a$ and having its free extremity positioned substantially at the same level as pivoting element 303; a roller 305 intercalated between elements 302 and 303 and displaceable by means of a lever 306 mounted to rotate about a fixed pivot 307 so as to move between shaft $15^a$ and pivot 303; a chamber 31 provided with a flexible wall 29 similar to membrane 40 and responding via conduit $31^1$ to variations in depression inside the intake manifold of the motor; a rod $10^2$ connected to diaphragm 29 and reacting on a series of elements $302^1$, $303^1$, $304^1$, $305^1$, $306^1$ and $307^1$ having a similar structure and function to those bearing the same numerals without the prime indices already described; a spring 11 provided with appropriate abutments and acting on a rod 10 concurrently with rod $10^1$ and in opposition to rod $10^2$ when the efforts of the latter rods are transmitted to shaft $15^a$ and lever 14 i. e., opposing variations due to increases in motor speed and favoring those caused by increases in the load-speed complex transmitted from the intake manifold to chamber $36^1$; a rod 26 mounted on a fixed pivot 27 and pivotally engaging with one end of rod 10; a pair of rollers $25^1$ and $25^2$ rotatably mounted on rod 26 in symmetrical relation to rod 10 and reacting on an assembly $304^2$, $306^2$ and $307^2$, similar to the same elements bearing the same numerals without indices; and an assembly composed of a lever $302^a$ pivotally mounted at $303^a$ transmitting displacements of rod 26 to lever $304^2$ through the intermediary of a pair of rollers $305^a$ and $305^b$ rotatably mounted on a pair of lever arms $308^a$ and $308^b$ positioned in symmetrical relation to rod $306^2$, rollers $308^a$ and $308^b$ being maintained in contact with levers $302^a$ and $304^2$ by the opposing action of spring 10 and a thrust element 310 pivotally mounted at 311.

The hereinabove described control system functions in the following manner: variations of depression in the intake manifold of the motor are transmitted to chamber 36¹ via conduit 39¹ and act on diaphragm 40 to displace rod 10¹ and oscillate lever 302 about point 303; the latter reacts on roller 305 to oscillate lever 304 so as to bring lever 14 into contact with one or the other of the terminals controlling the gear shifting mechanism; inasmuch as pivot 303 is positioned substantially at the same level as the free extremity of lever 304, the upward or downward movement of roller 305 will vary the lever arms taken with elements 303 and 15ᵃ as centers; in other words, the magnitude of the variations transmitted to lever 302 may be graduated to increase or decrease in value insofar as their effect on lever 304 (and therefore on lever 14) is concerned; similarly, variations in the speed of the motor modify the pressure inside chamber 31 to displace membrane 29 so as to actuate the various elements responding to displacements of rod 10², roller 305¹ acting in a manner similar to roller 305 to modify the effective turning moment transmitted from lever 302¹ to lever 304¹ and lever 14; otherwise expressed, displacements of roller 305¹ are effective to vary the action of changes in speed on lever 14; spring 11 is designed to retard the actions due to increases in motor speed and to favor those caused by increases in the load-speed complex transmitted through chamber 36¹ to lever 14, this being necessary in order that the motor may gain speed just prior to a gear shifting operation and thus, in slowing down, during this latter operation, have the proper speed demands at the time the gears are shifted; when lever 14 occupies its neutral position, rollers 25¹ and 25² are both in contact with lever 302ᵃ and spring 11 transmits its action to shaft 15ᵃ as if the intermediate elements were completely absent; when the effects transmitted from chambers 31 and 36¹ tend to move lever 14 into contact with terminal 38¹ (increasing speed ratios), lever 302 moves in the direction of the arrow, thus oscillating lever 26 and moving roller 25¹ out of contact with lever 302ᵃ; at this stage, spring 11 conserves its lever arm, since it is pivotally attached to lever 26, whereas the various forces acting on spring 11 act through a foreshortened lever arm; if, on the contrary, lever 14 oscillates into contact with terminal 38² (decreasing speed ratios), lever 302ᵃ moves in the opposite direction and roller 25² moves out of contact with the latter; the lever arm reacting on spring 10 and due to variations in motor operation is therefore lengthened so as to effect an asynchronism between the gear shifting operation and the movement of lever 14 controlling the latter; roller 305ᵃ and 305ᵇ act to modify the asynchronising action of spring 11 on lever 14 in a manner similar to rollers 305 and 305¹ as will be evident from an inspection of the drawings.

Levers 306, 306¹ and 306² may be mounted so as to be separately displaceable by the vehicle operator to modify the position of the various rollers displaceable therewith. All three levers may, however, be simultaneously displaced in any desired timed relation to one another by means of a cam shaft 313 provided with a series of cams 312, 312¹ and 312² each reacting via proper rollers on one of said levers. By varying the form and position of these cams, the levers in question are displaced in any order and to any magnitude desired.

Figure 2:
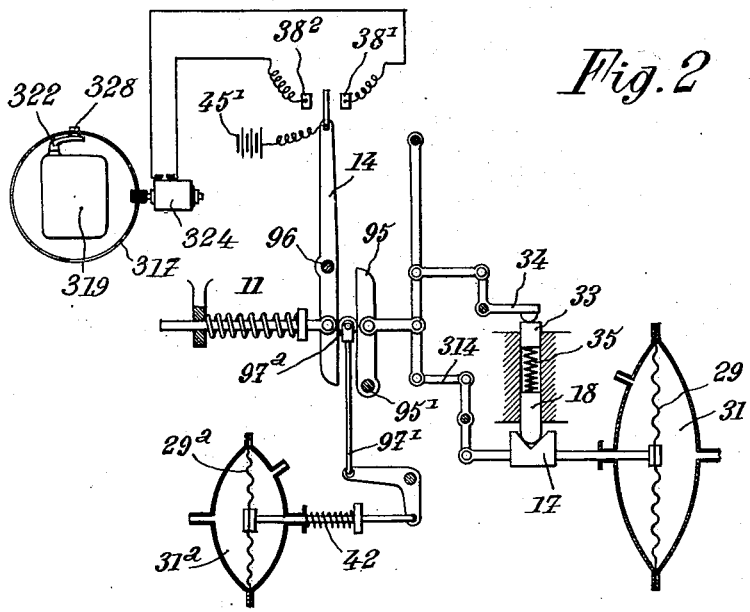
Fig. 2 shows, diagrammatically, a second form.

The form of device shown in Fig. 2 is a simplification of the one illustrated in Fig. 1 and includes a certain number of elements having the same structure and function and bearing the same reference characters as those shown in Fig. 1 coacting with the following additional structures: a chamber 31 connected by an appropriate conduit to the intake manifold of the motor; a diaphragm 29 responsive to variations of both motor speed and load caused by changes in pressure transmitted to chamber 31; a lever and link system 314 responsive to movement of diaphragm 29 and reacting on a lever 95 pivotally mounted at 95¹, the free extremity of this lever being positioned substantially in line, or on the same level, with the point of articulation 96 of lever 14; a roller 97ᵃ similar to those of the 305 series described in connection with Figure 1 and displaced by a transmission 97¹ connected to a diaphgram 29ᵃ responsive to variations in depression transmitted from the intake manifold of the motor to a chamber 31ᵃ; a spring 42 opposing displacement of diaphragm 29ᵃ, and a asynchronising assembly composed of a block 17 having a V shaped recess formed therein interposed in transmission 314, a pin 18 tending to move toward 17 under the action of a spring 35, and a link and lever system 34 transmitting displacements in system 314 to a piston 33 acting on spring 35.

Roller 97ᵃ is, here, automatically displaced as a function of variations in the speed-load complex transmitted from the intake manifold of the motor in a manner which is obvious from an inspection of the drawings, lever 14 being displaced by variations in the same complex. If desired, a second roller of the type of 97ᵃ may be mounted adjacent the latter to move between elements 14 and 95 under the control of the vehicle operator. In this way, variations of the action of the speed-load complex may be regulated automatically, manually, or both.

In the asynchronising assembly, it will be seen that if the displacements of element 34 were transmitted directly to pin 18, the action of the speed-load complex would not be effective to displace lever 14 until the magnitude thereof reached a predetermined value. By interposing spring 35 between pins 33 and 18, the retard (asynchronism) becomes proportional, up to a given limit, to the displacement of transmission 314.

Figure 3:
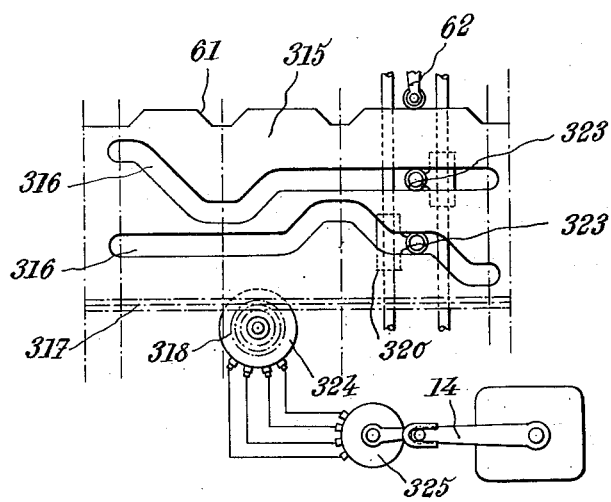
Fig. 3 represents, in development, a cam operative device for effecting the shifting of gears automatically as a function of variations in speed or load or both of the motor.
Figure 4:
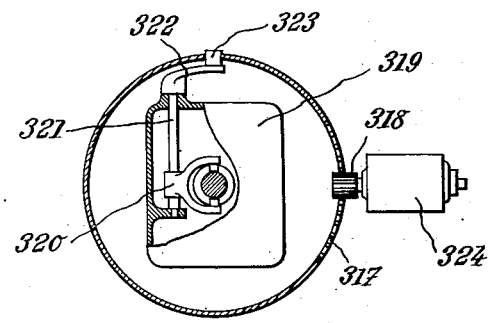
Fig. 4 is an elevation of a portion of the structure represented in Figs. 2 and 3.

In the form of assembly shown in Figures 2, 3 and 4 an auxiliary source of energy is used to effect the gear and clutch shifting operations under the control of lever 14 which may be also actuated by the control system represented on Figure 1. Here, a slotted cylindrical shell shown in development in Figure 3 is provided with cam slots 316 and a lateral cam surface 61. A plurality of pins 323 integral with a plurality of levers 322 are mounted to slide in cam slots 316, levers 332 being operative to rotate shafts 321 carrying forked elements 320 controlling a snatch gear assembly mounted inside a casing 319. The cylindrical shell is provided laterally with teeth 317 meshing with a pinion 318 driven by a motor 324. The latter is capable of turning in either direction under the action of lever 14 on an electrical inverter 325 (Fig. 3) of any convenient, current type. The opposite lateral edge of shell 315 contacts with a cam control rod 62 operating to gradually let in and throw out the motor clutch (not shown) during the periods of gear shifting.

The manner in which this assembly operates is practically evident from an inspection of the drawings. Lever 14 acts on element 325 to rotate motor 324 in one direction or the other so as to displace pins 323 laterally to effect a change in gear ratio or to bring the motor into neutral operation, clutch control element 62 coming into action at the proper moments to permit gear shifting to be effected.

What I claim is:—

1. In combination with an automatic gear shifting assembly, a control system comprising a moveable element, and means for displacing said moveable element including a pair of levers having their pivotal points positioned in spaced relation, and means interposed between said levers and positioned to be moved in the interval between said pivotal points, whereby the effect of the effort transmitted from one lever to the other, through the intermediary of said means, may be varied by displacement of the latter.

2. In combination with an automatic gear shifting mechanism for motor vehicles a moveable control element including means responsive to variations in speed of the motor, means responsive to variations in load on the motor, and means operative to vary the relative effect of both of said last named means on said moveable control element for predetermined changes in speed and in load.

3. A structure as defined in claim 2 in combination with means reacting on the control element opposing the action exerted on the latter by the means responsive to variations in speed during increasing speeds and acting concurrently with the means responsive to variations in load during increasing loads.

4. In combination with an automatic gear shifting mechanism for motor vehicles, a moveable control element operative to actuate said mechanism and means for displacing said control element including, means responsive to variations in load on the motor, means responsive to variations in speed of the motor, and means operated to simultaneously vary the relative effects transmitted by each of said last named to said moveable control element for predetermined changes in load and in speed.

5. A structure as defined in claim 4 and in combination with means operative to oppose the effect due to the means responsive to the variations in speed during increasing speeds and to act concurrently with said means responsive to variations in load during increasing loads, and means operative to vary the magnitude of the effect exerted by said last named means.

6. In combination with an automatic gear shifting mechanism, a moveable control element operative to actuate said mechanism and means for displacing said control element including a rotatable shaft mounted in driving relation to said control element, a pair of levers rigidly attached to said shaft, a pair of levers mounted in spaced relation to said first named pair of levers and having their pivotal axes mounted in spaced relation to said shaft, means for independently transmitting variations in two different motor operating factors to each of said last named levers and means for varying the effect of the effort transmitted from said last named pair of levers to said first named pair of levers comprising a pair of moveable elements interposed therebetween and mounted to move in the space between said shaft and the pivotal axes of said second named pair of levers.

7. A structure as defined in claim 6 in combination with means operative to simultaneously displace said moveable elements.

8. A structure as defined in claim 1 in combination with means operative by changes in a motor operating variable to displace said last named means.

9. A structure as defined in claim 1 in combination with means operative by variations in the speed of the motor to displace said last named means.

10. A structure as defined in claim 1 in combination with means operative by variations in the load on the motor to displace said last named means.

11. A structure as defined in claim 1 in combination with means operative by changes in the speed of, and by variations in load on, the motor to actuate said last named means.

12. A structure as defined in claim 2 in combination with means operative to oppose the action of the means responsive to the variations in speed when the latter is reacting to a speed increment.

13. A structure as defined in claim 2 in combination with means operative to act in the same direction as the means responsive to variations in load when the latter is reacting to a load increment.

14. A structure as defined in claim 2 in combination with means operative to oppose the action of the means responsive to variations in speed when the latter is reacting to a speed increment and to act in the same direction as the means responsive to variations in load when the latter is reacting to a load increment.

15. In an automatic gear shifting assembly, a motor provided with a driving shaft, a driven shaft, a clutch interposed between said driving and driven shaft, a gear assembly adapted to couple said driving and driven shafts at various speed ratios, a plurality of levers connected to the gear elements composing said gear assembly, a single cam element simultaneously controlling all of said levers, and means operative by changes in speed of the motor and by variations in load thereon to actuate said cam element so as to displace said levers.

16. In an automatic gear shift, a motor including a driving shaft, a driven shaft, a clutch interposed between said driving and driven shaft, means operative to vary the speed ratio between the driving and driven shaft when in coupled relation, a single cam element having a plurality of guiding surfaces formed therein, a plurality of elements coacting with said means and slidably mounted in said guiding surfaces, a motor driving said cam element, and means operative by variations in the speed of the driven shaft and the suction pressure exerted in the intake manifold of said first named motor to actuate said last named motor so as to rotate said cam element.

17. A structure as defined in claim 1 in combination with means operative by changes in suction exerted by the motor, to actuate said last named means.

In testimony whereof I affix my signature.

GASTON FLEISCHEL.